(12) United States Patent
Ragnet et al.

(10) Patent No.: US 7,562,223 B2
(45) Date of Patent: Jul. 14, 2009

(54) MULTIFUNCTION DEVICE WITH SECURE JOB RELEASE

(75) Inventors: Francois Ragnet, Venon (FR); Victor Ciriza, La Tour du Pin (FR); Olivier Fambon, Grenoble (FR); Yves Hoppenot, Notre Dame de Mesage (FR)

(73) Assignee: Xerox Corporation, Norwalk, CT (US)

( * ) Notice: Subject to any disclaimer, the term of this patent is extended or adjusted under 35 U.S.C. 154(b) by 763 days.

(21) Appl. No.: 11/013,323

(22) Filed: Dec. 17, 2004

(65) Prior Publication Data

US 2006/0136726 A1 Jun. 22, 2006

(51) Int. Cl.
H04L 9/30 (2006.01)
H04N 1/00 (2006.01)

(52) U.S. Cl. ............... 713/171; 713/170; 380/243; 380/259; 380/285

(58) Field of Classification Search .............. None
See application file for complete search history.

(56) References Cited

U.S. PATENT DOCUMENTS

| | | | |
|---|---|---|---|
| 5,862,321 | A | 1/1999 | Lamming et al. |
| 6,144,997 | A | 11/2000 | Lamming et al. |
| 6,378,070 | B1 | 4/2002 | Chan et al. |
| 6,688,230 | B2 | 2/2004 | Goh et al. |
| 6,711,677 | B1 | 3/2004 | Wiegley |
| 6,775,782 | B1 | 8/2004 | Buros et al. |
| 6,862,583 | B1 * | 3/2005 | Mazzagatte et al. ......... 705/64 |
| 7,003,667 | B1 * | 2/2006 | Slick et al. ............. 713/182 |
| 7,142,333 | B2 * | 11/2006 | Struble ................ 358/402 |
| 7,403,300 | B2 * | 7/2008 | Shahindoust ............ 358/1.15 |
| 2003/0050963 | A1 | 3/2003 | Lamming et al. |
| 2003/0069921 | A1 | 4/2003 | Lamming et al. |
| 2003/0196080 | A1 * | 10/2003 | Karman .............. 713/150 |
| 2004/0041834 | A1 | 3/2004 | Wegeng et al. |
| 2004/0041848 | A1 | 3/2004 | Wegeng et al. |
| 2004/0172586 | A1 | 9/2004 | Ragnet et al. |
| 2004/0205622 | A1 | 10/2004 | Jones et al. |

OTHER PUBLICATIONS

ArticSoft, "An Introduction to Public Key Infrastructure (PKI)", published on the Internet at http://security.ittoolbox.com/documents/, 2002.

"Basic Printing Profile Interoperability Specification", Bluetooth SIG Inc., available on the Internet at http://www.proteam.com.cn/bluetooth/documents/profile/PP_095a.pdf, Chapters 5, 6, and 7, pp. 23-56, 2001.

(Continued)

*Primary Examiner*—Nasser G Moazzami
*Assistant Examiner*—Fatoumata Traore
(74) *Attorney, Agent, or Firm*—Oliff & Berridge, PLC (57) ABSTRACT

A secure release of a job request is managed at a document processing system that has been issued a private key and a public key. In one embodiment, the job request includes a first part specifying job information that is encrypted using a symmetric key, and a second part specifying the symmetric key that is encrypted with a recipient's public key. The document processing system begins release of the job request upon receipt of the symmetric key encrypted using its public key. The document processing system uses its private key to decrypt the encrypted symmetric key. The decrypted symmetric key is then used to decrypt the first part of the job request, thereby permitting the document processing system to complete performance of the job request.

18 Claims, 4 Drawing Sheets

OTHER PUBLICATIONS

Berson, T. A., Dean, D., Franklin, M. K., Smetters, D. K. and Spreitzer, M. J., "Cryptography As A Network Service", in Network and Distributed Systems Security Symposium, Internet Society, Feb. 7-9, 2001, San Diego, CA.

Antonietta Grasso, Jean-Luc Meunier, "Who Can Claim Complete Abstinence from Peeking at Print Jobs?", Proceedings of CSCW-2002, ACM Conference on Computer Supported Cooperative Work, New-Orleans, Louisiana, U.S.A.

Hull, J. J., and Hart, P. E., "Toward zero-effort personal document management", IEEE Computer 34(3), 30-35, 2001.

"Printing Protocol", Xerox System Integration Standard, XNSS 118404, Apr. 1984.

Product Brochure, "Digital Imager Security Solutions", Sharpe, available on the Internet Aug. 13, 2004.

Product Brochure, "Canon/eCopy Solution with Microsoft Outlook/Exchange", available on the Internet at http://www.ecopy.com/documents/english_usa/connectors/msoutlookexchange_us_aug03.pdf, 2003.

Product Brochure, "Canon MEAP: Multifunctional Embedded Application Platform", available on the Internet at http://www.falconcopiers.co.uk/copiers/MEAP.htm, 2003.

Product Brochure, "Hp Autostore", available on the Internet at http://h10010.www1.hp.com/wwpc/pscmisc/vac/us/product_pdfs/AutoStore_WW_Datasheet.pdf, 2004.

Product Brochure, "HP Digital Sending software 4.0", available on the Internet at http://h10010.www1.hp.com/wwpc/pscmisc/vac/us/product_pdfs/DSS_4.0_Datasheet.pdf, 2005.

Product Brochure, "ImageSmart™ Workflow Suite", Canon, available on the Internet at http://www.usa.canon.com/cpr/pdf/Brochures/ImageSmartBrochure.pdf, 2002.

Product Brochure, "ScanRouter DocumentServer", Ricoh, available on the Internet at http://www.ricoh-singapore.com.sg/products/documentsolutions/prod_docsolu_docserver.html, 2003.

Product Brochure, "SD Express for Secure Business Document Transmission How It Works", available on the Internet Aug. 16, 2004.

Product Brochure, "Secure stored documents delivery with SecureJet 4.3", Jetmobile®, available on the Internet Aug. 13, 2004.

Product Brochure, "SecureDIMM Protect Sensitive Data", Capella Technologies, available on the Internet Aug. 16, 2004.

Product Brochure, "SecureJet® 4.3B White paper", HP, available on the Internet Aug. 13, 2004.

Product Brochure, Xerox Smartsend™, "From paper to digital to anywhere", available on the Internet at http://www.office.xerox.com/latest/SFTBR-04.PDF, 2005.

HP e-Services Secure Print brochure, Available on the Internet, dated 2001.

Lamming et al., "Satchel: Providing Access to Any Document, Anytime, Anywhere", ACM Transactions on Computer-Human Interaction vol. 7, Issue 3, pp. 322-352, 2000 (with specific reference to Section 5.4.5 "The Scan Service", pp. 337-338).

Frank Leymann, "Web Services Flow Language (WFSL 1.0)", IBM, available on the Internet at http://www-306.ibm.com/software/solutions/webservices/pdf/WSFL.pdf, Chapters 1 and 2, pp. 6-14, 2001.

Microsoft Windows CE .NET 4.2, "Cryptography", available on the Internet at http://msdn.microsoft.com/library/default.asp?url=/library/en-us/wcecrypt/html/ceconcryptography.asp, Apr. 2004.

Network Working Group, "Internet Printing Protocol/1.1: Encoding and Transport", RFC 2910, Sep. 2000.

Network Working Group, "Job Submission Protocol Mapping Recommendations for the Job Monitoring MIB", RFC 2708 (with particular reference to "Line Printer Daemon Protocol", Chapter 2, pp. 4-5), Nov. 1999.

Network Working Group, "Secure/Multipurpose Internet Mail Exchange (S/MIME) Version 3.1 Message Specification", RFC 3851, Jul. 2004.

Network Working Group, "The TLS Protocol Version 1.0", RFC 2246, Jan. 1999.

Network Working Group, "X.509 Internet Public Key Infrastructure Online Certificate Status Protocol—OCSP", RFC 2560, Jun. 1999.

"PrintMe, Leave The Technology To Us", EFI's PrintMe web site (www.printme.com), available on the Internet Feb. 15, 2003.

"PrintBoy Office Bundle", Cutting Edge Software, Inc., 1996-2001.

RSA Laboratories, "Frequently Asked Questions about Today's Cryptography", version 4.1, Chapter 2.1.1, "What is public-key cryptography?", pp. 21-22, May 2000.

Satish Thatte, "Xlang, Web Services For Business Process Design", Microsoft, available on the Internet at http://www.gotdotnet.com/team/xml_wsspecs/xlang-c/default.htm, 2001 (with specific reference to Chapters 1, 3, 5, 8, and 9).

U.S. Appl. No. 09/596,652, entitled "System, Method And Article Of Manufacture For Providing Cryptography Services Utilizing A Network", filed Jun. 19, 2000.

U.S. Appl. No. 10/737,973, entitled "System And Method For Providing Document Services", filed Dec. 18, 2003.

User Guide, "Xerox Printing", available on the Internet Aug. 13, 2004.

"vCard and vCalendar", Personal Data Interchange, internet mail consortium, available on the Internet at http://www.imc.org/pdi/, 2003.

J.Viega, M.Messier, & P. Chandra, "Network Security with OpenSSL", published by O'Reilly & Associates, Chapters 3 (pp. 45-73), 6 (pp. 171-192), and 8 (pp. 217-250), Jun. 2002.

"Workflow Process Definition Interface—XML Process Definition Language", Workflow Management Coalition, Workflow Standard (Final Draft WFMC-PC-1025) available on the Internet at http://www.wfmc.org/standards/docs/TC-1025_xpdl_102502.pdf, Chapter 5 (2 pages), 2002.

* cited by examiner

MULTIFUNCTION DEVICE WITH SECURE JOB RELEASE

BACKGROUND

The following relates generally to methods and apparatus, for managing secure release of a job request at a multifunction device.

Maintaining confidentiality of electronic transmission, capture, and processing of electronic documents at shared multifunction devices is important as more personal information is recorded electronically and the availability of shared and public multifunctional devices becomes more prevalent. There exist different solutions for managing the secure release of job submissions at multifunction devices, such as printers. For example, some multifunction devices provide a secure print release function that allows a user to associate a password with a print job at the time of job submission from a remote workstation; the printer then holds the print job until the corresponding password is entered at the printer.

Additional solutions for securely releasing print requests exist that are message based or session based (i.e., that are asynchronous or synchronous communication based, respectively). Further, such solutions that are available may make use of public key cryptography and/or infrastructure (PKI). Generally using the PKI infrastructure, any "entity" such as a person, organization, or computational device, may be issued a public/private key pair (where the public key is published, while the private key is kept secret). The PKI infrastructure allows print requests to be transmitted securely over insecure communication channels such as the Internet. A certificate authority (such as VeriSign, Entrust, etc.) may be used to vouch for the binding between a public key and its owner to allow one entity (such as the printer) to trust the other entity (such as the submitter of a print request) signing a certificate.

The following publications and US patents provide examples of existing solutions for enabling secure release of a print job request: "Printing Protocol", Xerox System Integration Standard, XNSS 118404, April 1984; "Xerox Network Systems Architecture", General Information Manual, XNSG 068504, April 1985; U.S. Pat. Nos. 6,378,070, 6,688,230, and 6,711,677. However, notwithstanding such solutions, it would be advantageous to provide a system in which the secure release of an encrypted print requests is performed asynchronously from a mobile computing device. It would be further advantageous to provide a method that makes use of existing cryptographic infrastructure to ensure the confidentiality, integrity, authenticity, and release of document job requests submitted to multifunction devices.

SUMMARY

Given the desire for solutions that enable secure release of job requests from mobile or roaming computing devices, there is disclosed herein a method, apparatus and article of manufacture, for managing a job request at a document processing system that has been issued a private key and a public key. The method includes: receiving the job request including a first part specifying job information that is encrypted using a symmetric key, a second part specifying the symmetric key that is encrypted with a recipient's public key, and possibly, a third part specifying a job/recipient identifier (which may be encrypted); receiving (from the recipient) the symmetric key encrypted using the public key of the document processing system (indicating release of the job request); using the private key of the document processing system to decrypt the symmetric key received (from the recipient) that is encrypted with the public key of the document processing system; using the decrypted symmetric key to decrypt the first part of the job request; and initiating performance at the document processing system of the decrypted job request (where the job request may request be one or a combination of services such as printing, scanning, storing, emailing, translating, converting, etc.).

In addition, there is disclosed herein a method, apparatus and article of manufacture, for carrying out a scan job request at a document processing system. The method includes: opening a wireless communications session with a mobile device having a public key and a private key; receiving the scan job request including scan parameters from the mobile device over the wireless communication session; scanning a physical document to record an electronic representation of the physical document; transmitting the electronic representation of the physical document to the mobile device; receiving, from the mobile device, the electronic representation of the physical document encrypted using the private key of the mobile device and a public key of a recipient device; and transmitting the encrypted electronic representation of the document to the recipient device.

BRIEF DESCRIPTION OF THE DRAWINGS

These and other aspects of the disclosure will become apparent from the following description read in conjunction with the accompanying drawings wherein the same reference numerals have been applied to like parts and in which.

DETAILED DESCRIPTION

A. System Elements and Operation

Figure 1:
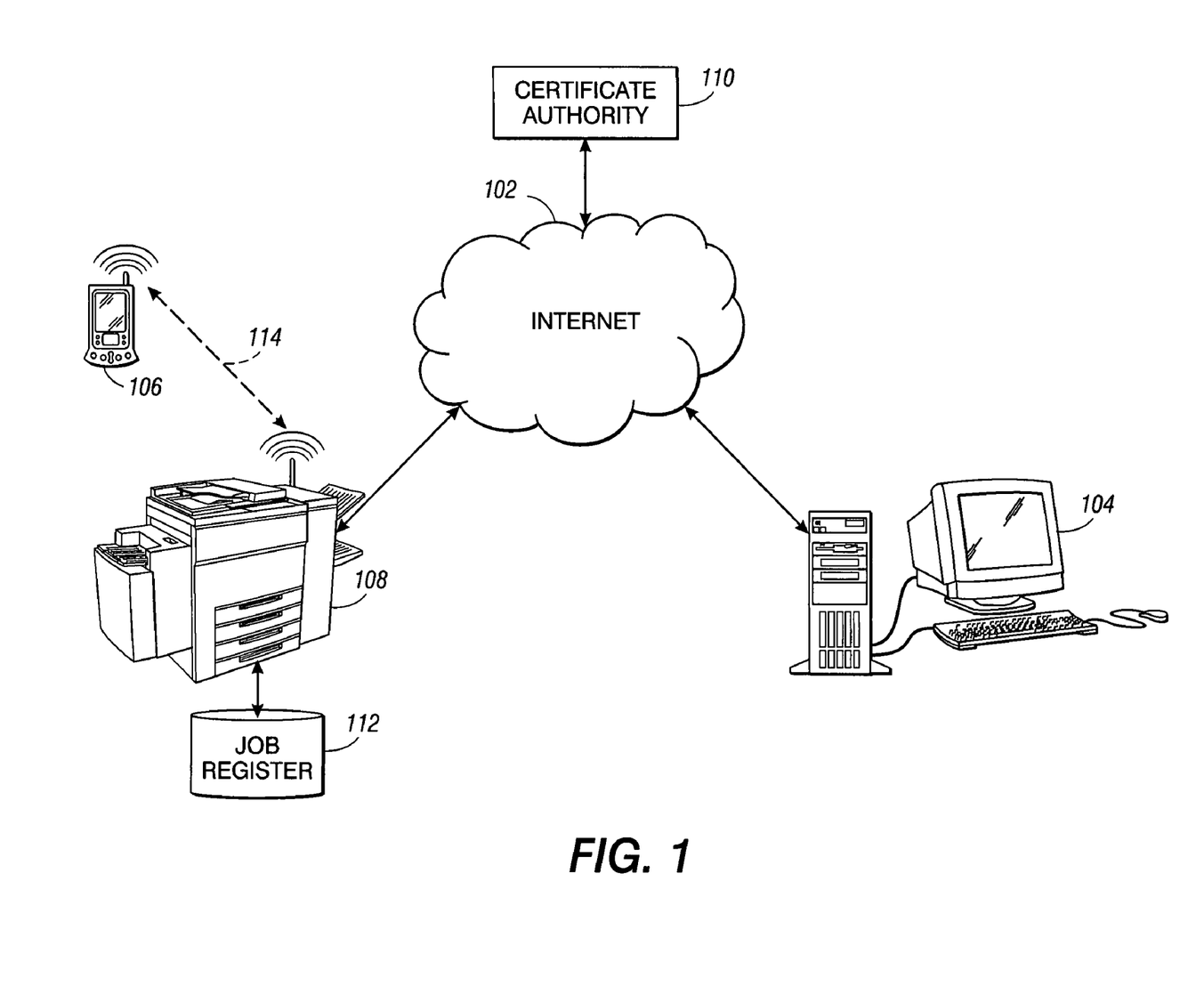
FIG. 1 illustrates a general block diagram showing a possible arrangement of elements for performing the actions shown in FIGS. 2-3.
Figure 2:
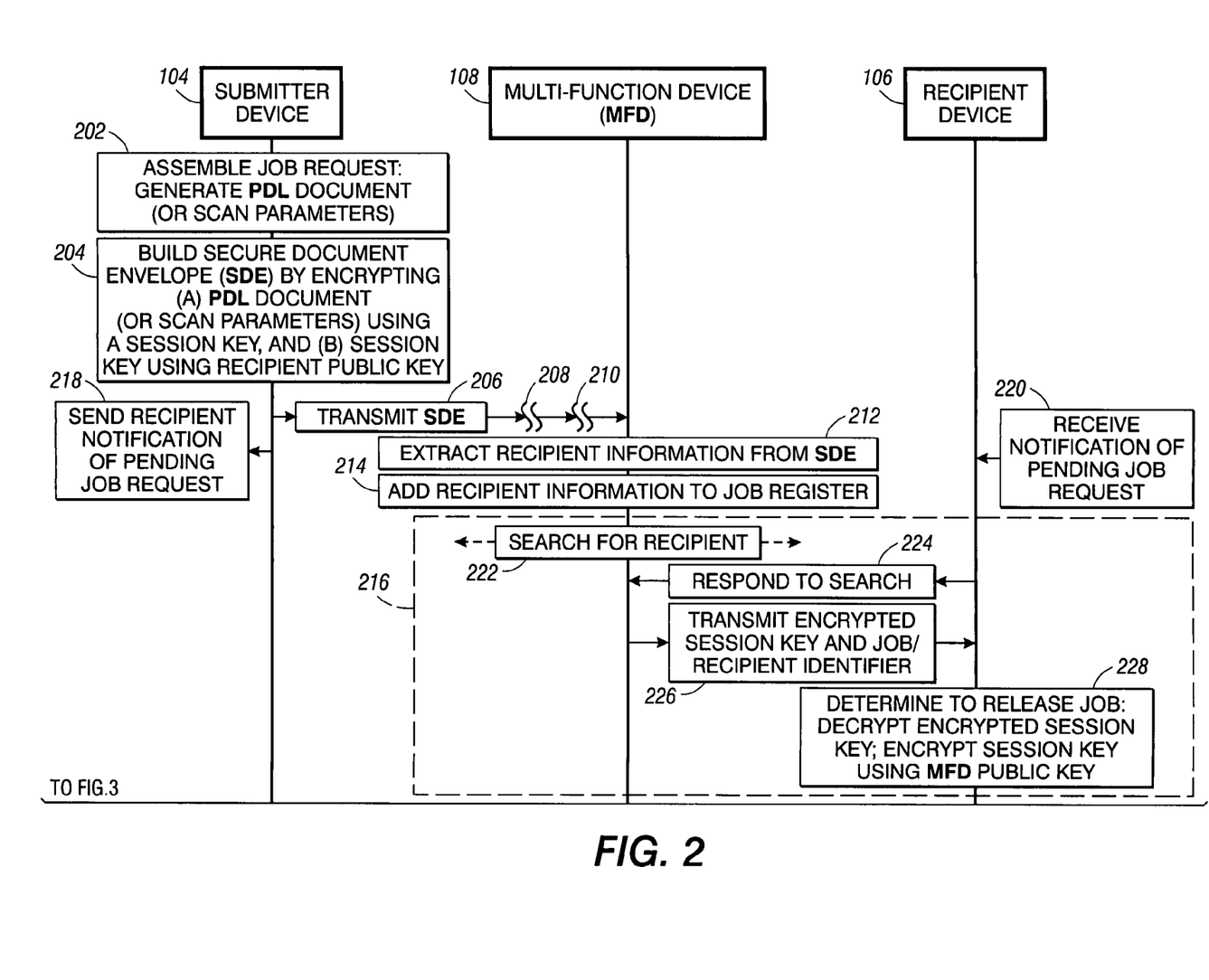
FIGS. 2-3 illustrate a general flow diagram of actions performed by the elements shown in FIG. 1 to provide secure release of a job request at a multifunction device.
Figure 3:
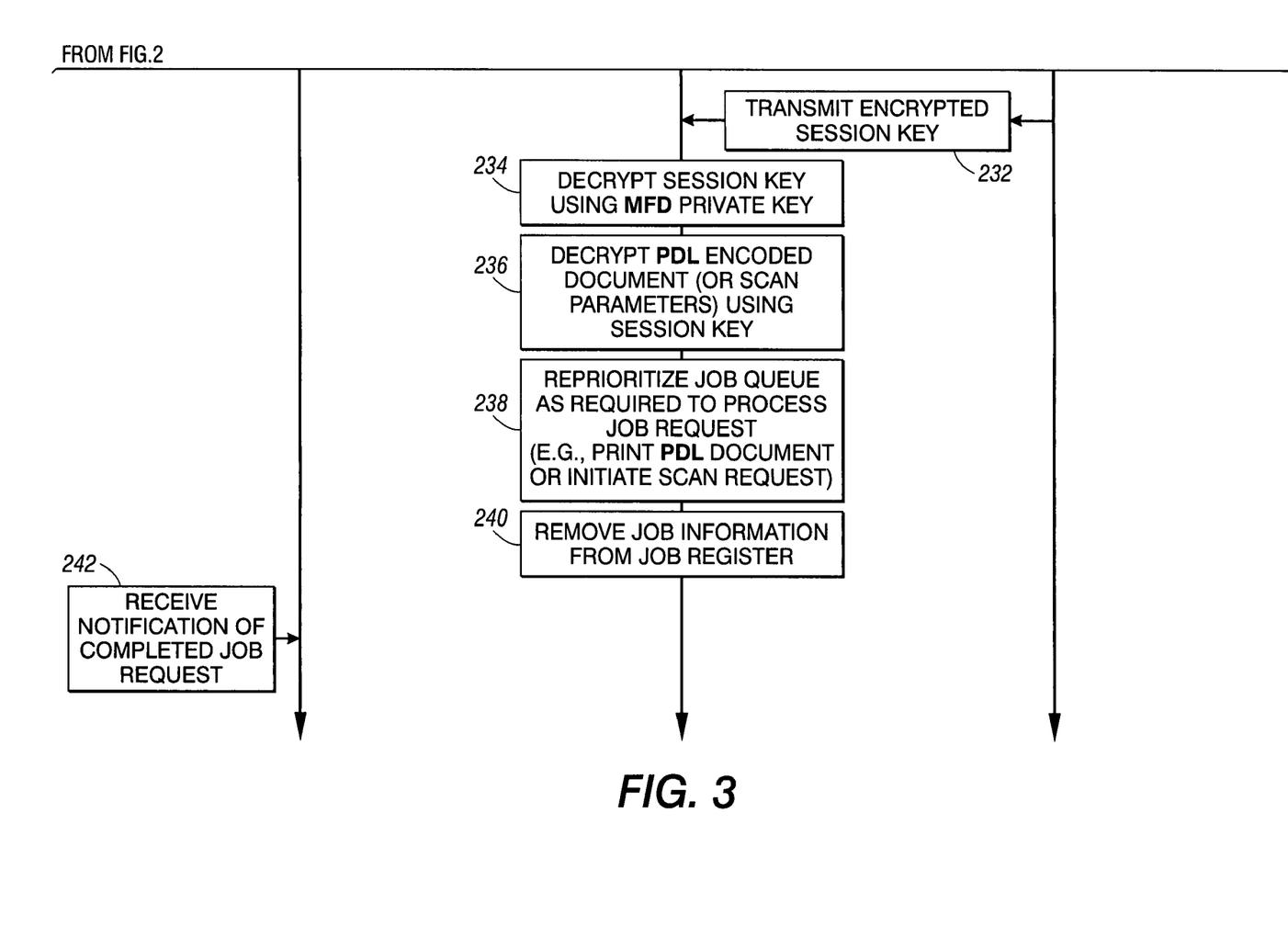

FIG. 1 illustrates a general block diagram showing a possible arrangement of elements for performing the actions shown in FIGS. 2-3. The elements shown in FIG. 1 include an arrangement of wired or wireless networks 102 such as the Internet which enables communication between a submitter device 104, a mobile (or roaming) device 106, a multifunctional device 108 (or alternatively referred to herein as a document processing system), and optionally a global registry of public keys or certificate authority 110 (which may issue and/or register digital certificates of any entity, including but not limited to, the submitter device 104, the recipient device 106, and the multifunction device 108, and/or for the users thereof). In addition, a job register 112 may form part of the multifunction device 108, or alternatively, may be made available on a server (not shown) that is communicatively coupled on the network 102 to the multifunction device 108.

FIGS. 2-3 illustrate a general flow diagram of actions performed by the devices shown in FIG. 1 to provide secure release of a job request at the multifunction device (MFD) 108. Initially at 202, a submitter at the computing device 104 assembles a job (or document service) request. The job request may include the performance of one or more of a combination of services such as printing, scanning, filing, translation, enrichment, correction, conversion, etc. By way of example, the details of printing and scanning services are shown in FIGS. 2-3 although it will be appreciated that alternate and/or additional services may be included with or be substituted for the scanning and/or printing services. Furthermore, although the scanning and printing services are shown to operate independently in FIGS. 2-3, a combination of scanning and printing may be performed using the method described herein.

More specifically at 202 in FIG. 2, assembly of a print job request in one embodiment involves producing print ready document, including printing preferences, that is represented for example using a PDL (page description language) such as PostScript®. The printing preferences specify, for example, copy count, copy quality, one or two sided imaging, sheet size and paper color. In an alternate embodiment at 202, a scan job request is assembled, which includes specifying scan parameters such as scan resolution, scan image file format (e.g., TIFF, PDF, JPEG, etc.), file storage location, transmission address (e.g., email, fax number), and transfer protocol (e.g., email, facsimile, SMS, ftp, etc.). The file location which specifies a location for storing the scanned document may include a password for accessing the location.

At 204 in FIG. 2, the submitter device 104 builds a secure document envelop (SDE). The secure document envelop includes various encrypted and (possibly) non-encrypted parts. A symmetric key and a public key (from a public/private key pair) are each used to encrypt and decrypt information concerning parts of the SDE transmitted between entities over an insecure communication channel. One part of the SDE prepared by the submitter device 104 that is intended to be read only by the multifunction device 108 is encrypted using a symmetric key (or session key). Another part of the SDE prepared by the submitter device 104 that is intended to be read only by the recipient device 106 (until the recipient device decides otherwise) is encrypted using the public key of the recipient.

The manner of encrypting information using a symmetric key and a public/private key pair does not permit an eavesdropper to deduce the encrypted contents of the SDE transmitted over an insecure communication channel over which the entities may communicate. In addition, the use of both a symmetric key and a public/private key pair provides the following functions: (A) the symmetric key ensures that the contents of the job request cannot be tampered with, destroyed, stolen, and/or transmitted outside the multifunction device (assuming the multifunction device does not share the contents or the symmetric key); (B) the symmetric key encrypted with the public key of the recipient ensures that the symmetric may not be used to access the contents of the job request except if the recipient decrypts it using its private key (thereby providing a secure release).

More specifically in one embodiment, the SDE includes (i) a first part specifying job information that is encrypted using a symmetric key, (ii) a second part specifying the symmetric key that is encrypted with a recipient's public key, and (iii) a third part specifying a job/recipient identifier (which may be encrypted initially using the MFD's public key). In other embodiments, other combinations and/or arrangements of encrypted data may be defined. For example in one alternate embodiment, the third part may also be encrypted using the recipient's public key before transmission to the recipient at 226, as discussed in more detail below.

In yet another embodiment, the SDE is defined using: (a) job submitter information, which includes (a1) a user name and (a2) a submitter public key (for authentication/encryption purposes); (b) multifunction device information, which includes (b1) a device name, (b2) a device identifier/address (such as a URL), and (b3) a device public key (for authentication/encryption purposes); (c) recipient device information, which include (c1) a device name, (c2) a network address (e.g., MAC address), (c3) a device type (e.g., RFID, Bluetooth, etc.), and (c4) a device public key; (d) document information, which includes (d1) document rendering, encoding or transmission format (e.g., output document format, input document format, transmission format, etc.), (d2) encryption method (e.g., symmetric, asymmetric) and encryption data (e.g., digital signature, asymmetric key), (d3) encrypted elements (e.g., PDL encoded document and job properties, such as, title, creation date, number of pages, sides imaged, paper etc.) or document placeholder (e.g., input/output format scan, fax, email, store, etc., document properties, number of pages, etc.).

At 206 in FIG. 2, the SDE is transmitted to a multifunction device (or single-function device) for processing job requests. The multifunction device (MFD) 108 may perform one or more of a combination of the following functions: document recording, document transmission, document processing, document archival, and document printing. Document recording functions may include, for example, scanning, document retrieval, video recording, receipt of facsimile transmissions, receipt of email message (e.g., using an embedded email client), etc. Document transmission include, for example, document archival or storage, facsimile transmission, transmission of email messages (e.g., using an embedded email client), session based transmission (e.g., HyperText Transport Protocol Secure sessions), etc. Document processing includes image and/or content processing, such as, image cleaning, document translation, document format conversion, optical character recognition (OCR), document enrichment, etc. Document printing encompasses reproduction of electronic signals onto a physical medium such as paper, transparency, card stock, etc.

The transmission of the SDE to the MFD may include one or more levels of indirection at 208 and 210 before arriving at the MFD. In one embodiment, the document is received using a print protocol standard. In alternate embodiments, the document is received as email or as a result of fetching an embedded document or as an HTTPS (HyperText Transport Protocol Secure) upload session submission. Such levels of indirection may include local and print server spooling and transmission through gateways and/or proxy servers and over private, semi-public, and public networks such as the Internet. Throughout each level of indirection 208 and 210 (if any exist) the SDE is encrypted for protection against interception attempts.

At 218 in FIG. 2, in the event the submitter device 104 does not serve also as a recipient device 106 (e.g., the submitter has access to the recipient public key, or the recipient has other means of knowing of the job request, or the submitter and recipient key pairs are equivalent, or the submitter device and the recipient device are equivalent) or there is no or an interrupted communication link between the submitter device or the recipient device, the submitter device 104 transmits a notification of a pending job request to the recipient or recipient device 106, which the recipient receives at 220. The notification of the pending job request may contain, for example, a job identifier (such as a title or a number identifier) to allow the recipient to identify the job and an MFD identifier to identify which MFD is about to process the job request (such as a link to a map identifying the location of the MFD, which may be updated depending on whether any redirection of the job performed by the MFD to another MFD has taken place).

At 212 in FIG. 2, upon receiving the SDE from the submitter device 104, the MFD 108 extracts the job/recipient identifier, which may be encrypted using the public key of the MFD (and which it can decrypt using its private key should that be the case). At 214, the job/recipient identifier is added to the job register 112 (which in an alternate embodiment may include notifying the submitter and/or recipient of its submission). The job/recipient identifier may specify one or more of a job identifier, recipient name, recipient public key, submission date, expiration date, etc. At a minimum, the job/recipient identifier contains sufficient information for the MFD 108 to identify (and/or recognize) a recipient device at which a job request is pending, whatever identifying/recognizing information that may comprise. Responsive to such identification/recognition the MFD 108 is adapted at 216 to establish a communication session with recipient device 106 possessing or having access to the recipient private key (for decrypting the symmetric key encrypted with the recipient public key).

In one embodiment at 216 when the MFD 108 establishes communication sessions with a job recipient recorded on its job register 112, such recipient devices are roaming (i.e., mobile) devices that are adapted to establish local wireless communication sessions with the MFD over a communication channel. To establish communication channel, the MFD and recipient devices have embedded therein one or more transceivers for establishing one or more wireless connections (or sessions) that may take place over one or more separate communication channels. For example in the embodiment shown in FIG. 1, the MFD 108 searches for and establishes a communication session over communication channel 114 with recipient roaming device 106.

In one embodiment at 216, the recipient device 106 is adapted to establish at least one (short-range) wireless connection over a proximity network with MFD 108. A short range connection may be established over RF (Radio Frequency) using, for example, a Bluetooth specification or 802.11 family (otherwise known as WiFi—Wireless Fidelity) compliant technology, or over IR (Infrared) using, for example, an IrDA (Infrared Data Association) standard compliant technology. Examples of roaming devices include: mobile phones, PDAs (Personal Digital Assistants), portable computers, communicators, portable cameras, etc. More generally, the roaming device 106 when coupled over communication channel to MFD 108 may be coupled through networks or directly using any arrangement of wired and/or wireless connections.

Further, the MFD 108 may include one or more device specific capabilities (or functions) for providing its available services to the recipient device that may either be operating with a registered or a non-registered user (i.e., a guest user). In one embodiment, the functions of the MFD 108 may be offered for free or for fee depending on the nature and location where the services are offered. In addition, the MFD 108 may have embedded therein functionality for serving as a network access point for a proximity network (i.e., a bridge between short-range wireless connections with the recipient device 106 and wire-based networks such as the Internet 102).

More specifically in the embodiment shown at 216, the MFD 108 searches at 222 for computing devices identified in its job register 112, for example, by soliciting discovery requests or listening for discovery request of devices registering on its local wireless network. At 224, the recipient device 106 responds to the search by, for example, establishing a communications session with the MFD 108. At 226, the MFD transmits the encrypted symmetric key, and optionally, with a job/recipient identifier to allow the recipient to identify the job request. In an alternate embodiment, the MFD transmits the job/recipient identifier encrypted using the public key of the recipient device (thereby requiring the recipient device to decrypt the job/recipient identifier using its private key in order that it may be read).

At 228 in FIG. 2, the recipient device makes a determination to release the job request at the MFD (i.e., allow the MFD to perform the job request defined in the SDE). This determination by the recipient device 106 entails decrypting the encrypted symmetric key received from the MFD 108 using its private key and encrypting the decrypted symmetric key using the public key of the MFD 108. At 232, the encrypted symmetric key is transmitted to the MFD. The MFD then decrypts the encrypted symmetric key using its private key at 234. In an alternate embodiment, the recipient device receives the symmetric key encrypted using its public key at 220 as part of the notification received from the submitter device. In this alternate embodiment, in response to a communication session being established at 216 between the multifunction device and the recipient device, the decrypted symmetric key received from the submitter device is transmitted to the MFD encrypted using the public key of the MFD at 232.

At 236 in FIG. 3, using the decrypted symmetric key, the PDL encoded document is decrypted (or alternatively the scan parameters are decrypted). At 238, the job queue is (optionally) reprioritized to process the job request, which in one embodiment involves rendering the PDL encoded document. In an alternate embodiment, a scan job is initiated using decrypted scan parameters, to electronically record and transmit and/or store the results. With any job request, the MFD may begin reprioritizing the job queue once a communication session is established with the recipient device 106 at 216.

Upon completing a job request at 240 in FIG. 3, the job information is removed from the job register 112, which may include sending a notification to the submitter device 104 at 242 that the job request has completed. In alternate embodiment, the submitter device 104 may receive a notification of completion of the job request at 242 from the recipient device and/or through a link to the job register 112, which identifies the status of the job request. In this alternate embodiment, the submitter device 104 may periodically query the job register 112 to determine the ongoing status of the submitted job request. Further in this alternate embodiment, the job request may be terminated (with notice of termination being sent from either the MFD or submitter device to the recipient device).

Advantageously, in the described manner of securely releasing a print request: (a) document content and parameters are protected throughout a job processing chain (or more generally workflow), (b) the release (i.e., imitation of performance) of document job requests at a multifunction device is triggered by asymmetric cryptographic exchanges between the submitting device and the MFD; (c) the recipient device that releases the job request at the MFD communicates with the MFD over a proximity network, thereby insuring direct and/or immediate contact with the MFD; (d) a job registry records status information thereby enabling the MFD to actively search for and identify devices that may be able to release job requests; (e) the job registry provides a location for identifying status information by the submitting device; (f) the job queue of the MFD may be optionally reprioritized to accommodate the identified proximity of a recipient coupled with the release of a job request (where the proximity of the recipient may be, for example, identified by location/tracking information provided through the proximity network or by GPS coordinates).

B. Alternate Scanning Embodiment

Figure 4:
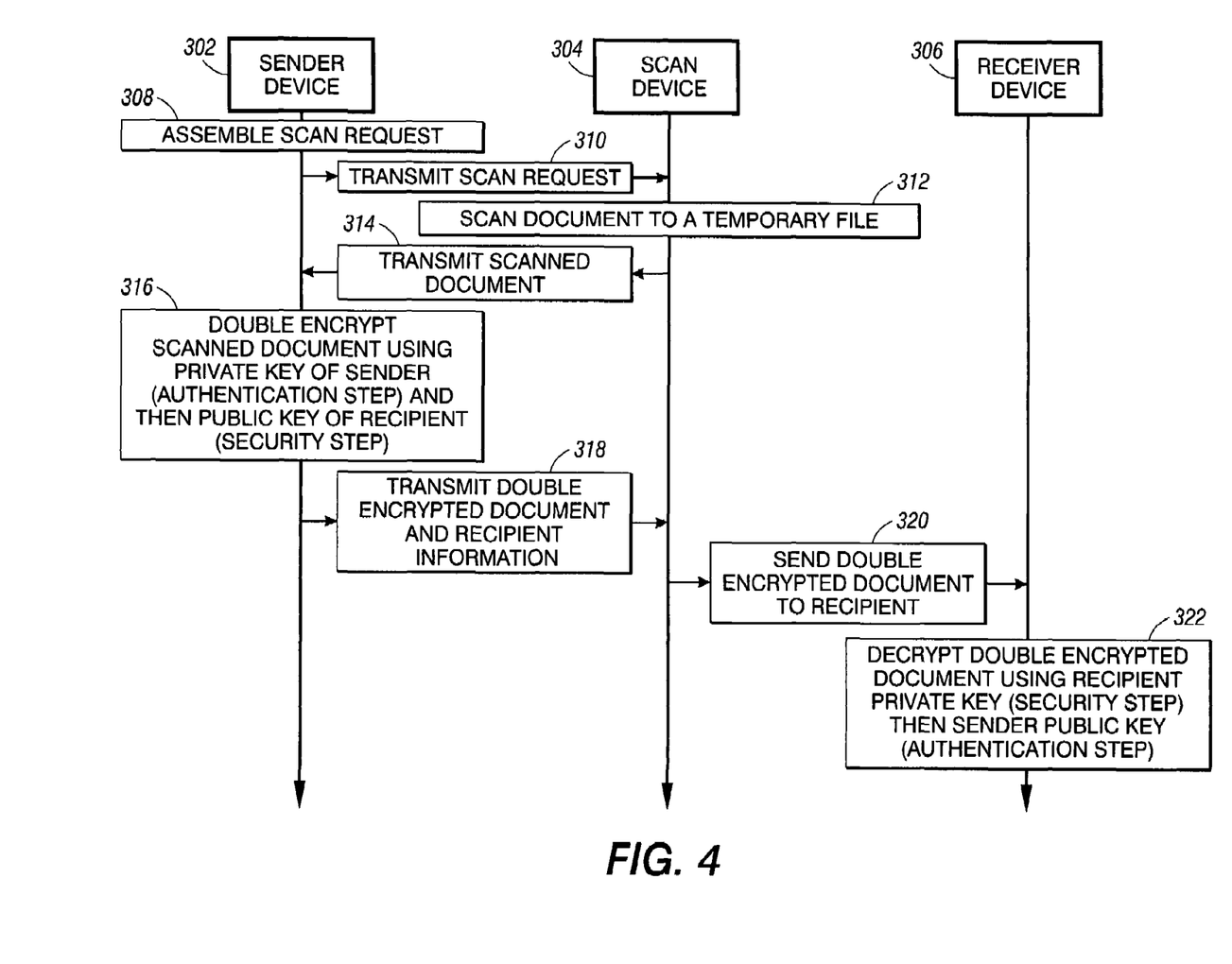
FIG. 4 illustrates an alternate embodiment for distributing scanned documents.

FIG. 4 illustrates an alternate embodiment for distributing scanned documents, which includes as operating elements: a sender device 302, a scan device 304, and a receiver device 306. In operation at 308, the sender device, which may comprise a mobile or roaming device, such as the mobile device 106 shown in FIG. 1 assembles thereon a scan request 308, that may include one or more additional services as part of a workflow (as, for example, described in Ser. No. 10/605874, "Method And Apparatus For Controlling Document Service Requests From A Mobile Device", which is incorporated herein by reference).

At 310, the sender device 302 transmits over a short-range wireless channel the scan request to the scan device 304, the scan device may be a single or multi functional device that is adapted to record an electronic representation (e.g., digital image) of a physical (e.g., hardcopy) document. In response to receiving the scan request, the scan device 304 stores the electronic representation of the document at 312 to a temporary file, the contents of which are transmitted either intermittently as the document is being scanned (e.g., either block by block or page by page) or upon conclusion of the scan at 314 back to the sender device 302.

Upon receipt of the entire scanned document, the sender device 302 double encrypts the scanned document. First, the scanned document is encrypted using the private key of the sender for authentication purposes. Subsequently, the private key encrypted contents are encrypted with the public key belonging to a desired recipient (or recipient device) for security purposes. It will be understood by those skilled in the double encryption may be performed in the reverse order, namely, that the scanned document could alternatively be first encrypted using the public key of the recipient and then encrypted using the private key of the sender.

At 318, the double encrypted contents of the scanned document together with recipient information are transmitted by the sender device 302 to the scan device 304, which it subsequently retransmits to the recipient at 320. Retransmission may involve transmission using any form of electronic message or session interchange, or a combination of both. Upon receipt of the double encrypted document, the receiver device 306 decrypts the document using the private key of the recipient and the public key of the sender at 322.

C. Cryptographic Network Service

Cryptography performed to carry out the embodiments described herein may be performed using a cryptographic network service. For example, the cryptographic network service may be used by: the submitter device 104 to encrypt the PDL document at 204 in FIG. 2; the recipient device 106 to encrypt the session key at 228 in FIG. 2; and the MFD 108 to decrypt the session key at 234 and the PDL encoded document at 236 in FIG. 3. Details of a cryptographic network service is described in the publication by Berson, T. A., Dean, D., Franklin, M. K., Smetters, D. K. and Spreitzer, M. J., entitled "Cryptography As A Network Service", published in Network and Distributed Systems Security Symposium, Internet Society, Feb. 7-9, 2001, San Diego, Calif. , and in U.S. patent application Ser. No. 09/596,652, entitled "System, Method And Article Of Manufacture For Providing Cryptography Services Utilizing A Network", which are both incorporated herein by reference.

D. Miscellaneous

Further background of elements discussed herein may be found in the following U.S. patent application identified by their serial numbers and titles, which are all hereby incorporated (including their incorporated references) herein by reference: Ser. No. 10/737,973, "System And Method For Providing Document Services"(File No. A3130-US-NP); Ser. No. 10/605,874, "Method And Apparatus For Controlling Document Service Requests From A Mobile Device"(File No. A3085-US-NP); and Ser. No. 10/202,027, "Electronic Filing System With Scan-Placeholders"(File No. A0846-US-NP).

Those skilled in the art will recognize that the ITU X.509 standard is one of many standards that defines information forming part of a certificate and describes the data format of that information. Generally, certificates rely on public key cryptographic systems in which private and public keys are paired and used for privacy (i.e., through encryption) and/or authentication (i.e., digital signatures). The entity to which a public/private key pair is issued may be based on a user and/or the user's system (e.g., desktop, laptop, PDA, etc.). Thus, a user's devices and/or the user may each be issued a public/private key pair. Examples of applications that use certificates include: Web browsers that support the SSL (Secure Socket Layer) protocol, and the secure e-mail standard Secure/Multipurpose Internet Mail Extensions (S/MIME).

Also, those skilled in the art will recognize that general purpose computer systems may be used for implementing those elements of the systems described herein and shown in the Figures. An example general purpose computer would include hardware and software. The hardware would comprise, for example, a processor (i.e., CPU), memory (ROM, RAM, etc.), persistent storage (e.g., CD-ROM, hard drive, floppy drive, tape drive, etc.), user I/O, and network I/O. The user I/O can include a camera, a microphone, speakers, a keyboard, a pointing device (e.g., pointing stick, mouse, etc.), and the display. The network I/O may for example be coupled to a network such as the Internet. The software of the general purpose computer would include an operating system.

Further, those skilled in the art will recognize that the forgoing embodiments may be implemented as a machine (or system), process (or method), or article of manufacture by using standard programming and/or engineering techniques to produce programming software, firmware, hardware, or any combination thereof. It will be appreciated by those skilled in the art that the flow diagrams described in the specification are meant to provide an understanding of different possible embodiments. As such, alternative ordering of the steps, performing one or more steps in parallel, and/or performing additional or fewer steps may be done in alternative embodiments.

Any resulting program(s), having computer-readable program code, may be embodied within one or more computer-usable media such as memory devices or transmitting devices, thereby making a computer program product or article of manufacture according to the embodiment described herein. As such, the terms "article of manufacture", "computer readable medium" and "computer program product" as used herein are intended to encompass a computer program existent (permanently, temporarily, or transitorily) on any computer-usable medium such as on any memory device or in any transmitting device.

Executing program code directly from one medium, storing program code onto a medium, copying the code from one medium to another medium, transmitting the code using a transmitting device, or other equivalent acts may involve the use of a memory or transmitting device which only embodies program code transitorily as a preliminary or final step in making, using, or selling the embodiments as set forth in the claims.

Memory devices include, but are not limited to, fixed (hard) disk drives, floppy disks (or diskettes), optical disks, magnetic tape, semiconductor memories such as RAM, ROM, Proms, etc. Transmitting devices include, but are not limited to, the Internet, intranets, electronic bulletin board and message/note exchanges, telephone/modem based network communication, hard-wired/cabled communication network, cellular communication, radio wave communication, satellite communication, and other stationary or mobile network systems/communication links.

A machine embodying the embodiments may involve one or more processing systems including, but not limited to, CPU, memory/storage devices, communication links, communication/transmitting devices, servers, I/O devices, or any subcomponents or individual parts of one or more processing systems, including software, firmware, hardware, or any combination or subcombination thereof, which embody the disclosure as set forth in the claims.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A method for managing a job request at a document processing system that has been issued a private key and a public key, comprising:
   receiving the job request including a first part specifying job information that is encrypted using a symmetric key, and a second part specifying a first encrypted symmetric key that is encrypted with a public key of a recipient that has been issued a private key and the public key;
   transmitting at least the first encrypted symmetric key to at least one of the recipient and a server offering cryptographic services to decrypt the first encrypted symmetric key;
   receiving a second encrypted symmetric key that is decrypted from the first encrypted symmetric key using the private key of the recipient and encrypted using the public key of the document processing system;
   using the private key of the document processing system to decrypt the second encrypted symmetric key that is encrypted with the public key of the document processing system;
   using the symmetric key decrypted from the second encrypted symmetric key to decrypt the first part of the job request; and
   initiating performance of the decrypted job request.

2. The method according to claim 1, wherein said receiving the job request further comprises receiving the job request including a third part specifying a job/recipient identifier.

3. The method according to claim 2, further comprising transmitting the third part and the second part of the job request to the recipient.

4. The method according to claim 3, wherein the third part is encrypted using the public key of the document processing system.

5. The method according to claim 4, wherein the third part is decrypted by the document processing system.

6. The method according to claim 3, wherein the third part is encrypted using the public key of the recipient before it is sent to the recipient.

7. The method according to claim 2, wherein the job/recipient identifier comprises a device identifier.

8. The method according to claim 2, wherein the document processing system communicates with the recipient over a proximity network connection.

9. The method according to claim 8, further comprising storing the job request in a job registry.

10. The method according to claim 9, further comprising searching for the recipient using the job/recipient identifier over the proximity network.

11. The method according to claim 10, further comprising receiving a request to terminate the job request stored in the job registry.

12. The method according to claim 1, further comprising locating the recipient device after issuing discovery requests and matching identifiers of responding devices with the recipient device identifier.

13. The method according to claim 1, wherein the job information comprises information concerning a print request.

14. The method according to claim 1, wherein the job information comprises information concerning a scan request.

15. The method according to claim 1, wherein the job request is given priority by the document processing system when the symmetric key is received from the recipient.

16. The method according to claim 1, wherein the document processing system in performing the job request performs one or more of printing, scanning, faxing, archiving, storing, emailing, converting, and translating.

17. The method according to claim 1, wherein the document processing system receives the second encrypted symmetric key encrypted using the public key of the document processing system from the recipient; and wherein the second part of the job request is decrypted by the recipient using its private key before encrypting the symmetric key with the public key of the document processing system.

18. A document processing system that has been issued a private key and a public key, comprising:
   a memory for storing processing instructions for managing a job request; and
   a processor coupled to the memory for executing the processing instructions for managing the job request; the processor in executing the processing instructions;
   receiving the job request including a first part specifying job information that is encrypted using a symmetric key, and a second part specifying a first encrypted symmetric key that is encrypted with a public key of a recipient that has been issued a private key and the public key;
   transmitting at least the first encrypted symmetric key to at least one of the recipient and a server offering cryptographic services to decrypt the first encrypted symmetric key;
   receiving a second encrypted symmetric key that is decrypted from the first encrypted symmetric key using the private key of the recipient and encrypted using the public key of the document processing system;
   using the private key of the document processing system to decrypt the second encrypted symmetric key that is encrypted with the public key of the document processing system;
   using the symmetric key decrypted from the second encrypted symmetric key to decrypt the first part of the job request; and
   initiating performance of the decrypted job request.

* * * * *